United States Patent [19]
Papadopoulos

[11] Patent Number: 6,099,320
[45] Date of Patent: Aug. 8, 2000

[54] AUTHORING SYSTEM AND METHOD FOR COMPUTER-BASED TRAINING

[76] Inventor: Anastasius Papadopoulos, 721 S. Lieser Rd., Vancouver, Wash. 98664

[21] Appl. No.: 09/110,628

[22] Filed: Jul. 6, 1998

Related U.S. Application Data

[60] Provisional application No. 60/052,792, Jul. 7, 1997.

[51] Int. Cl.[7] ....................................................... G06T 7/20
[52] U.S. Cl. .......................... 434/322; 345/418; 345/302; 434/118; 434/323; 434/365
[58] Field of Search ..................................... 434/118, 322, 434/323, 324, 327, 335, 365; 345/418, 473, 121, 425, 302; 703/13, 21, 22

[56] References Cited

U.S. PATENT DOCUMENTS 5,784,546  6/1998  Benman, Jr. ............................ 345/302

*Primary Examiner*—Jessica J. Harrison
*Assistant Examiner*—Chanda Harris
*Attorney, Agent, or Firm*—Fulbright & Jaworski, LLP

[57] ABSTRACT

The present invention is an integrated system for authoring, operating, maintaining, and administering a computer-based training program. The system includes integrated hardware and software that allows an author to create computer-based training modules that include audio, video, and textual content without requiring any programming. The invention uses a virtual training center metaphor that serves as the basis of the interface between the users and the system. The virtual training center provides a nonintimidating visual environment that is open and relaxing, thereby preparing the student to learn rapidly. To create a non-intimidating environment and to fix more of the student's attention on the subject matter to be learned, rather than on the learning tools themselves, the interface maintains as much as possible the illusion of being in a real training center. The system performs administrative functions, such as ensuring that students take courses in proper sequence, tracking training activity and course completion, and notifying the course administrator when a course is completed.

11 Claims, 15 Drawing Sheets

AUTHORING SYSTEM AND METHOD FOR COMPUTER-BASED TRAINING

This application claims priority from U.S. Provisional patent application Ser. No. 60/052,792, filed Jul. 7, 1997.

FIELD OF THE INVENTION

The invention is related to the field of computer-based training and, in particular, to a system for authoring, administering, and deploying an interactive computer training curriculum.

BACKGROUND OF THE INVENTION

Computer-based training has been used successfully by industry for many years because it provides many advantages over conventional instructor-led training classes. Unlike a classroom in which the students and instructor must meet physically in the same location at the same time, computer-based training can be made available at any time and place that is convenient for individual students. Computer-based training developed at one site can be used around the world. Unlike classroom instruction, in which the instructor must target training speed to the majority of students, bypassing slow learners and boring fast learners, computer based training is one-to-one, so that each individual can proceed at his or her own pace.

Students retain more of what they learn in computer-based training because it is possible to reinforce the learning by having each individual student perform some task on the computer repeatedly to apply the newly acquired knowledge. Computer-based training also allows students to review their training skills as needed and when a refresher course is necessary, without the usual scheduling conflicts and the expense of an instructor. Current computer-based training systems suffer from several drawbacks. Computer-based training courses, particularly multimedia computer-based training courses, are very expensive to develop. One commonly used estimate for the cost of computer-based training is that each minute of training costs $1,000 to produce. This is based on approximately 2000 hours of work required to create a single hour of computer-based training at $30 per hour.

Producing a computer-based module requires expertise in the course subject matter as well as expertise in technical areas such as recording audio and video information, interfacing the recorded information with a computer, editing the audio and video information, page design, and educational theory. Merely figuring out how to digitize and input audio or visual data of a particular format into an editing program that requires a different format, can be a formidable task. Inferior computer-based training modules that are ineffective result from computer-based training modules being produced by individuals that lack any of the many skills required to produce a good training module.

Another problem with computer based training is the discomfort that many students feel with computers. Students are required to learn not only the subject matter, but also how to operate the computer and several applications with different look and feel, which can cause stress that reduces the effectiveness of learning.

SUMMARY OF THE INVENTION

An object of the invention is, therefore, to provide a training system that conveys a maximum knowledge to the student for a minimum of resources.

Another object of the invention is to provide a non-intimidating learning environment that minimizes the student's attention on the training tools, that is, the computer hardware and operating software, to maximize the student's attention on the subject matter being taught, to encourage the students and to ensure they can perform the trained tasks with ease.

Yet another object of the invention is to remove technical barriers to the authoring of computer-based training so that authors are not required to become computer engineers or programmers.

Still another object of this invention is to provide training system administration that ensures students follow a prescribed curriculum and that faithfully records training activity.

Yet another object of the invention is to provide an integrated training system that provides standardized, compatible, extensible tools for authoring, learning, and administering training.

The present invention is an integrated system that includes functions for authoring, operating, and maintaining a computer-based training program. In one aspect of the invention, the system includes integrated hardware and software that allows an author to create computer-based training modules that include audio, video, and textual content without requiring any programming. The author is not required to be aware of the underlying operating system of the computer or of the details of interfacing between the authoring computer and the recording tools. The system is extensible in that the author, if so desires, can access the underlying operating system and programming tools to create training content that is beyond the capability of the original system. The system also allows the integration of other technologies, such as audio, video and imaging formats or other media, without requiring the author to perform hardware or software interfacing.

Another aspect of the invention is the use of a training center metaphor that serves as the basis of the interface between the users and the system. Although the subject matter is presented on a computer terminal screen, images on the screen create the impression of a physical training center. Cues that indicate that a computer is being used are minimized or eliminated. The virtual training center provides a nonintimidating visual environment that is open and relaxing, thereby preparing the student to learn rapidly.

To create a non-intimidating environment and to fix more of the student's attention on the subject matter to be learned, rather than on the learning tools themselves, the interface maintains as much as possible the illusion of being in a real training center. To this end, manifestations of the operating system, such as computer icons and pop-up menus, are minimized or eliminated. By minimizing computer symbols, a student's discomfort with the computer can be reduced, and the student can concentrate on learning the material, not on learning how to operate and interact with the computer. All learning modules created with the invention have a similar look and feel so that the user can become comfortable with a single interface that is used for training, authoring, and administering varied training courses and programs.

To conform to the metaphor of an open, relaxing learning environment, the virtual training center may display, for example, an open room with training terminals partially walled off from each other to the extent that would be required to reduce distractions for real students. A large portion of the outside walls of the virtual training center may be windowed, showing a quiet, relaxing scene, such as a serene mountain lake or a desert. The lack of computer symbols, such as icons and pull down menus serves to maintain the illusion of a real, physical training center: Real physical training centers do not have pull down menus.

The system also performs administrative functions, such as ensuring that students take courses in proper sequence, tracking training activity and course completion, and notifying the course administrator when a course is completed.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

There are three user levels for logging onto the system: author, administrator, and student. The invention is most clearly explained by describing the aspects common for all users and then the separate but integrated functions of the three different types of users.

Common Aspects

The preferred embodiment uses a metaphor of a training center to create a consistent, non-intimidating, relaxed learning environment. FIGS. 1–6 show an example of how a Virtual Training Center (VTC) would appear to a user. The non-intimidating environment of the virtual training center metaphor is maintained for all three levels of users.

Figure 7:
FIG. 7 shows a typical workstation used with the present invention.
Figure 8:
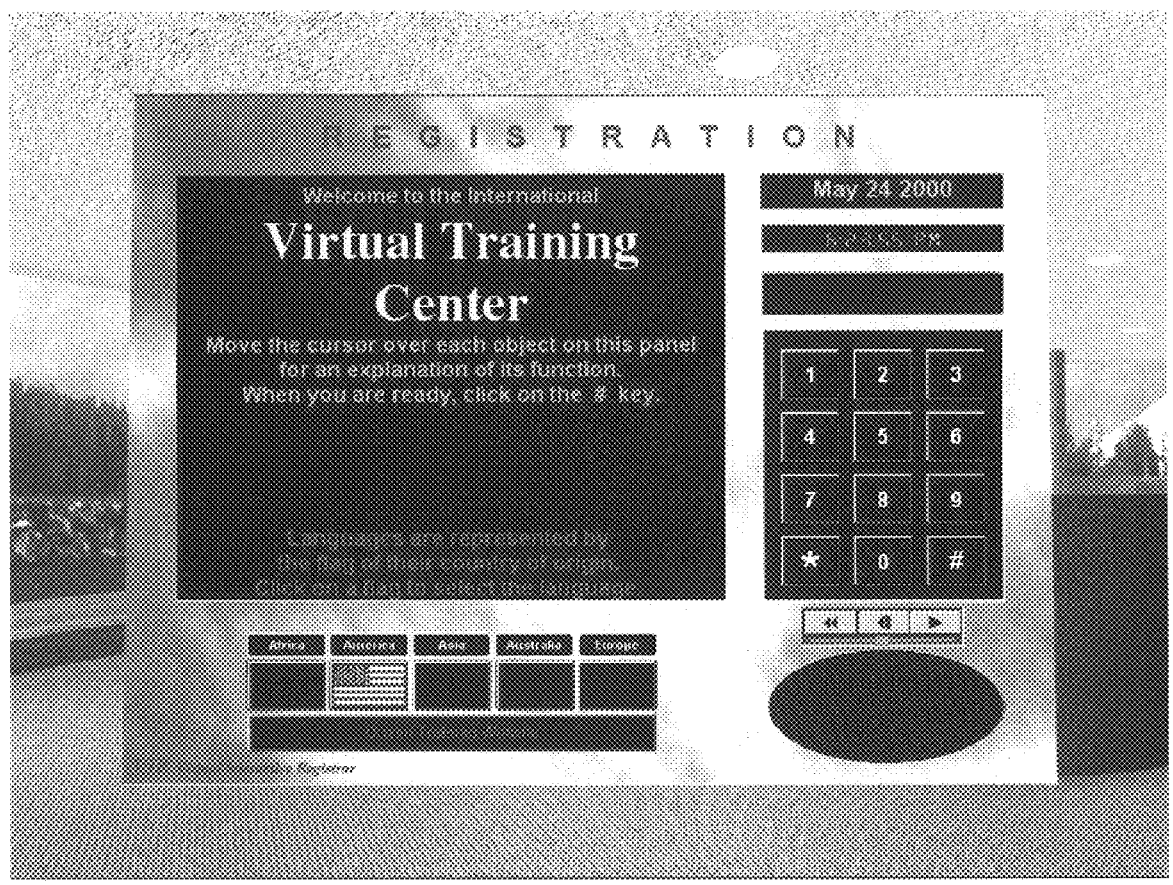
FIG. 8 is a screen display showing the Registration Board of FIG. 1.

The invention is preferably implemented using an industrial computer workstation with a large screen, high resolution monitor. (FIG. 7) The display presents the training material on a portion of the computer terminal screen and shows the background of the virtual training center on the remainder of the screen. (FIGS. 8–14) For example, in a monitor that supports a resolution of 1024×768 pixels, the learning material is presented in a 640×480 pixel area and the remainder of the monitor displays a background showing a virtual training center. The constant display of the virtual training center in the background keeps the user psychologically connected to the virtual training center and helps prevent disorientation.

Controls on the screen are designed to resemble mechanical devices. For example, the student plays a video clip of an operation by using a control that resembles a control on a familiar video cassette player. Sound effects, such as motors turning and other mechanical sounds, are used to simulate the mechanical device to enhance the perception of operating a real mechanical device. The function of each mechanical control, such as knobs and pushbuttons, is displayed on the device's display screen as a mouse cursor approaches a control.

As a user begins a session, the monitor displays an image of a Registration Board (FIGS. 1 and 8) at the entrance of the Virtual Training Center. The system identifies the access level of a user as a student, author, or administrator as they log in using their assigned identification and password. The Registration Board can also provide a choice of languages for the training. The user is instructed, verbally and in text, in the log-in procedure in several languages. Selecting a particular language, can cue the Application to present the course in that particular language, provided it has been authored as such. If the user enters a valid identification and password, the display shows the perspective of an individual moving towards an entry door. The user then presses a button to enter the Virtual Training Center. By pressing the button for entry, the user is performing an affirmative act to psychologically prepare himself for authoring, training or administration.

Upon entering the training area of the cylindrical Virtual Training Center, the Application shows a student's perspective moving towards an Atrium at its center. The Virtual Training Center is shown in a 360° panoramic view, having exterior windows that look out upon a serene vista, such as a mountain or a desert scene. Even during actual training, a portion of the screen maintains the image of the Virtual Training Center, thereby maintaining the student in a state of mind conducive to training by having him feel he is in a quiet, peaceful setting, as opposed to a noisy workplace. The user is then guided through the Atrium and proceeds to one of several training workstations, that is, a "Multimedia Instructor" containing a Virtual Interactive Player ("VIP").

Figure 9:
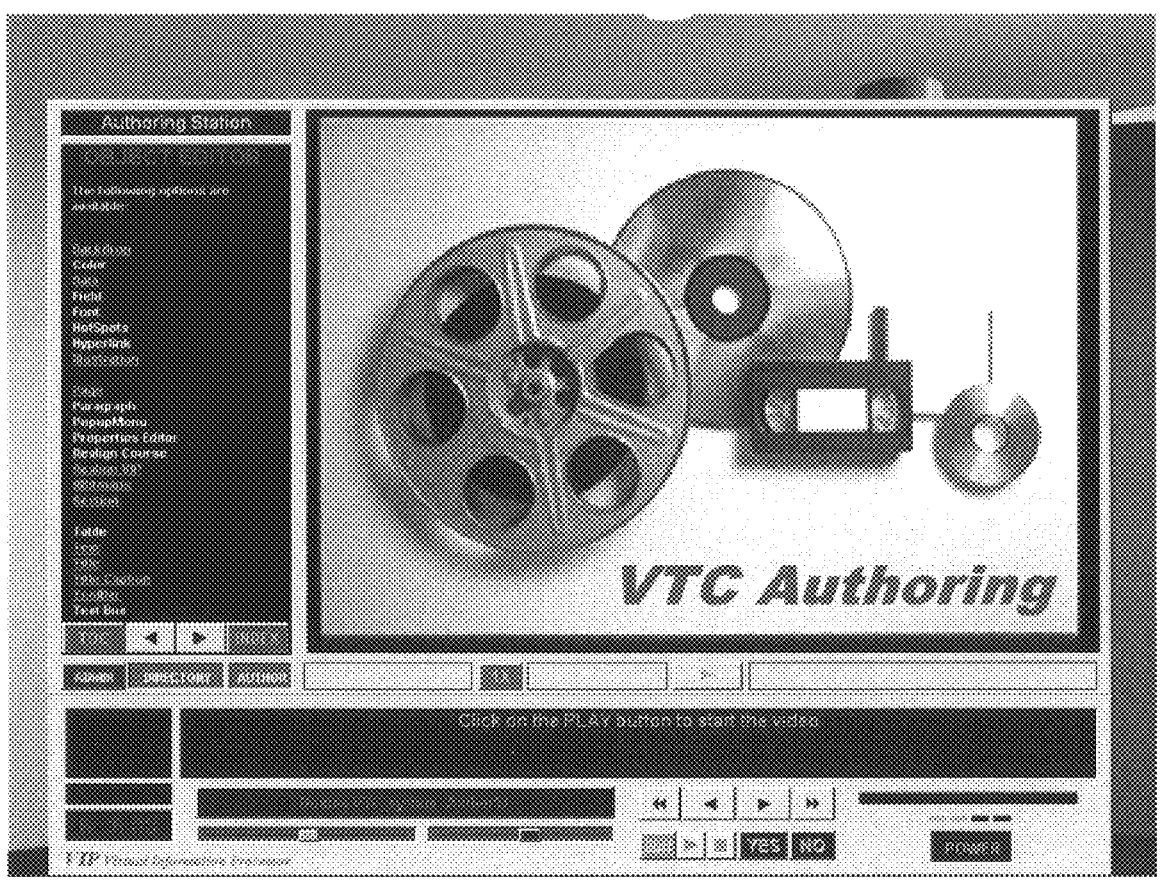
FIG. 9 is a screen display showing on the Virtual Interactive Player of FIG. 4 a typical author's Virtual Interactive Player Directory
Figure 10:
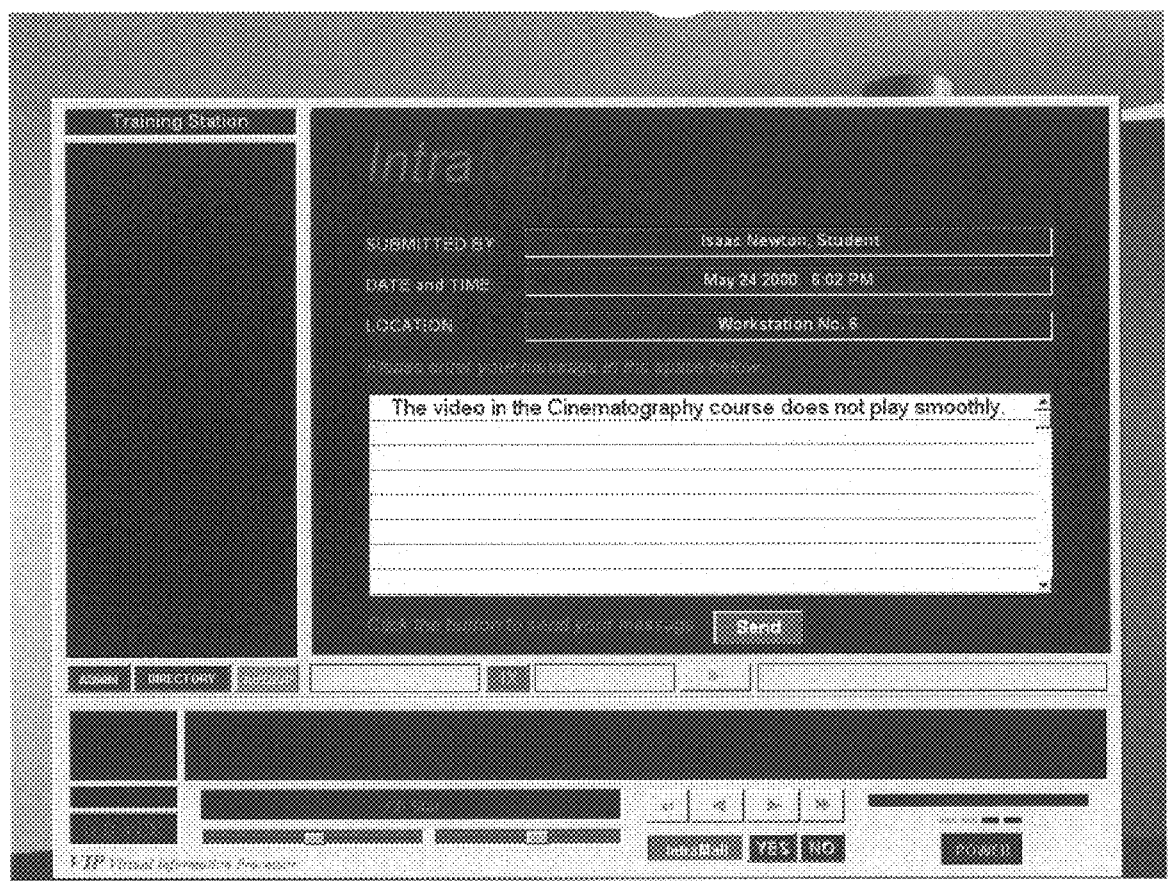
FIG. 10 is a screen display showing on the Virtual Interactive Player of FIG. 4 a Request Form for communicating between system users.
Figure 11:
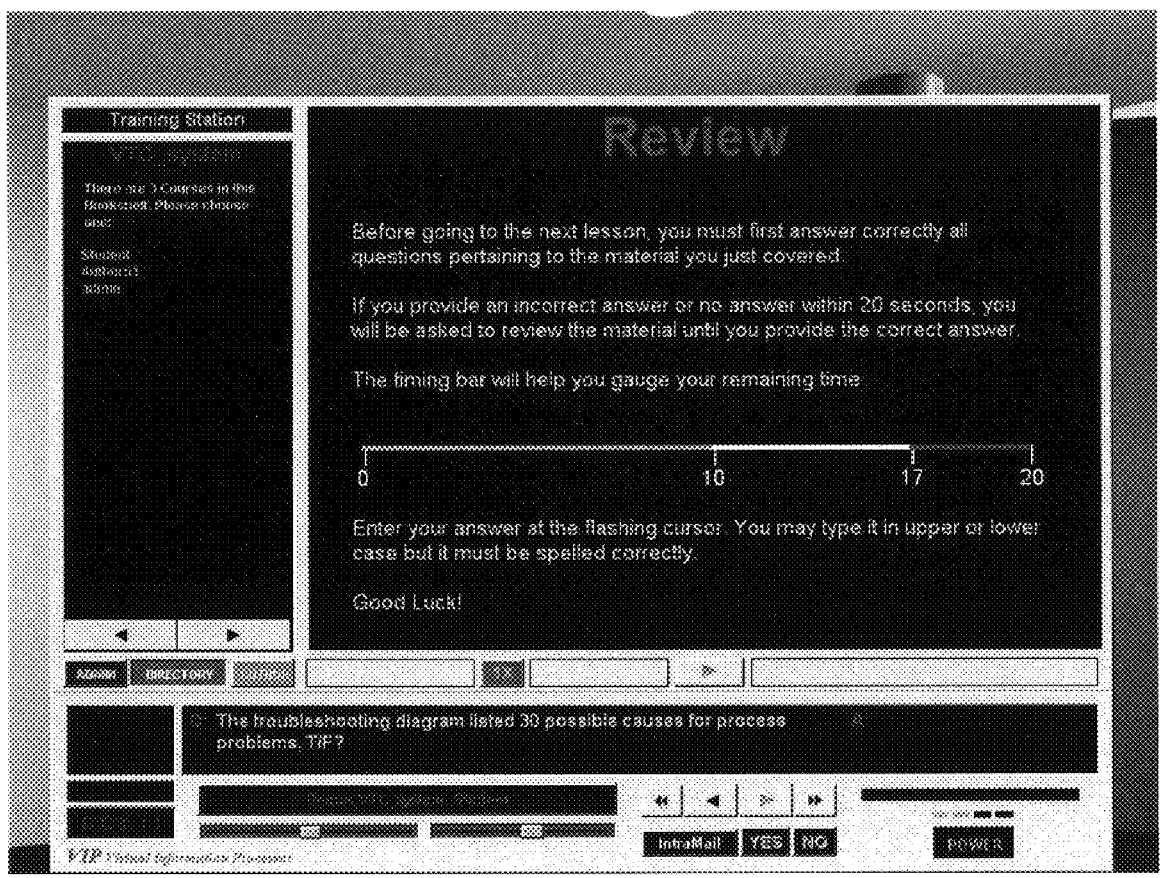
FIG. 11 is a screen display showing on the Virtual Interactive Player of FIG. 4 a typical review question presentation.

At the VIP, the user is presented with the VIP Directory that shows the options accessible to the user. The options will depend on the type of user and on the individual student's curriculum. The VIP Directory is essentially a menu appearing in the form of a 5-part dynamic directory (FIG. 9). It indicates the options that are available to the user or that will be available to the user in the future, such as courses that are part of the student's curriculum but are unavailable until prerequisites are completed. The options are color coded: green options execute when they are selected and white options open another set of sub-options. The directory sub-options can go up to four deep.

The selections run different applications. Each application has a table of contents. Maintaining the metaphor of a physical environment, the table of contents of each application appears as it would in a real book. The application also includes an alphabetical list of topics. Both the Table of Contents and the List of Topics are generated and updated a automatically as the author assembles or edits a course.

A common item to all users is a Request Form (FIG. 10), that is, an internal messaging system by which the students, administrators, and authors can communicate about training issues. The messaging system is not interconnected with any other network, so that only training related messages are passed through the system, thereby removing non-training related distractions during training sessions.

Figure 1:
FIG. 1 is a screen display showing an image of a student at the Registration Board at the entrance of the Virtual Training Center.
Figure 2:
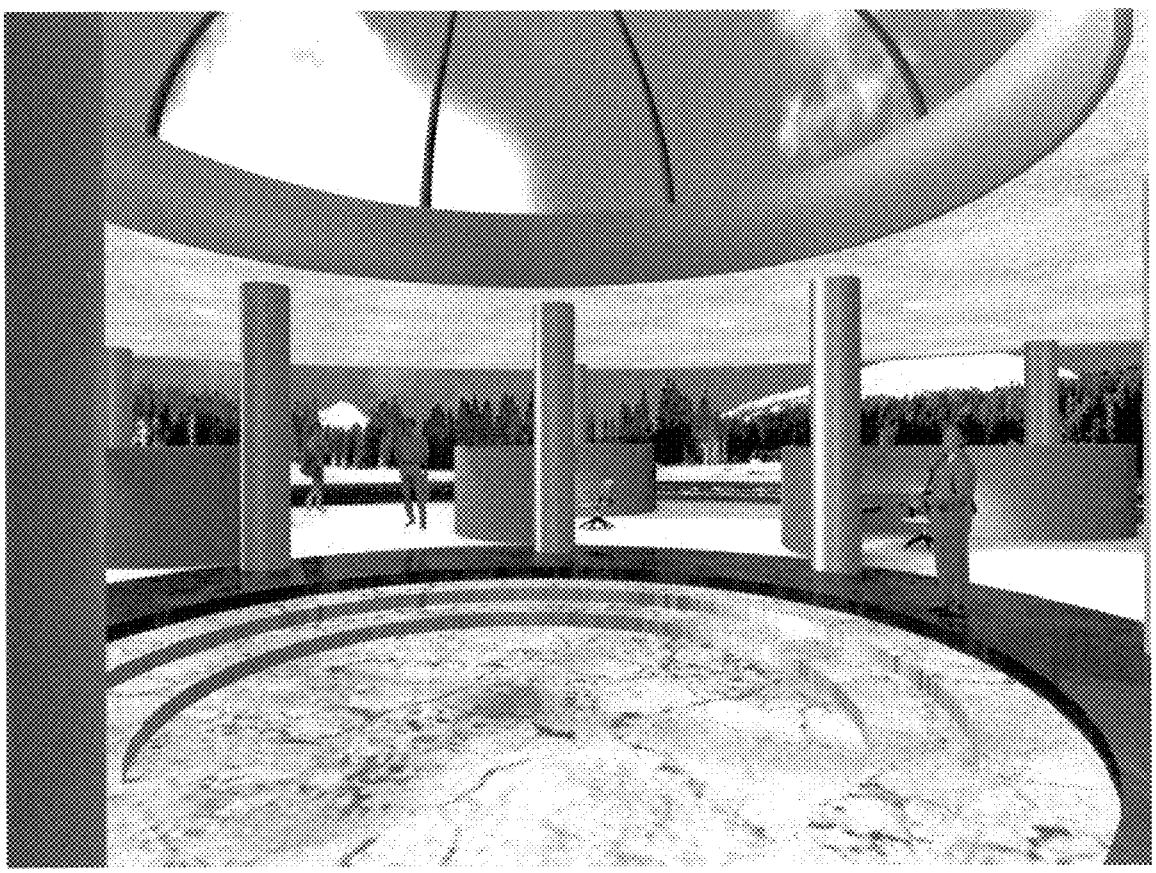
FIG. 2 is a screen display showing an image of a student having entered the Virtual Training Center of FIG. 1.
Figure 3:
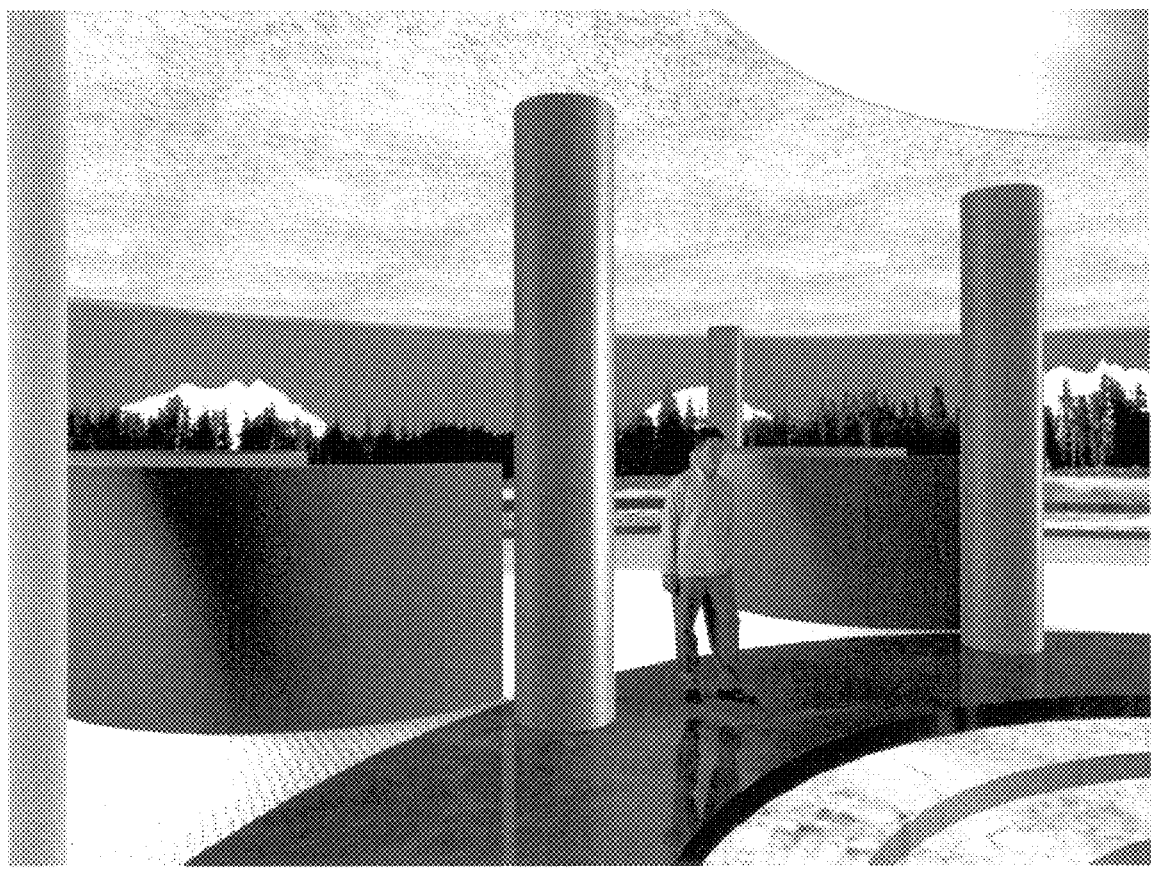
FIG. 3 is a screen display showing an image a workstation in the Virtual Training Center of FIG. 1 from the viewpoint of a student approaching the workstation.
Figure 4:
FIG. 4 is a screen display showing an image of two Virtual Interactive Players from the viewpoint of a student entering the workstation in the Virtual Training Center of FIG. 3.
Figure 5:
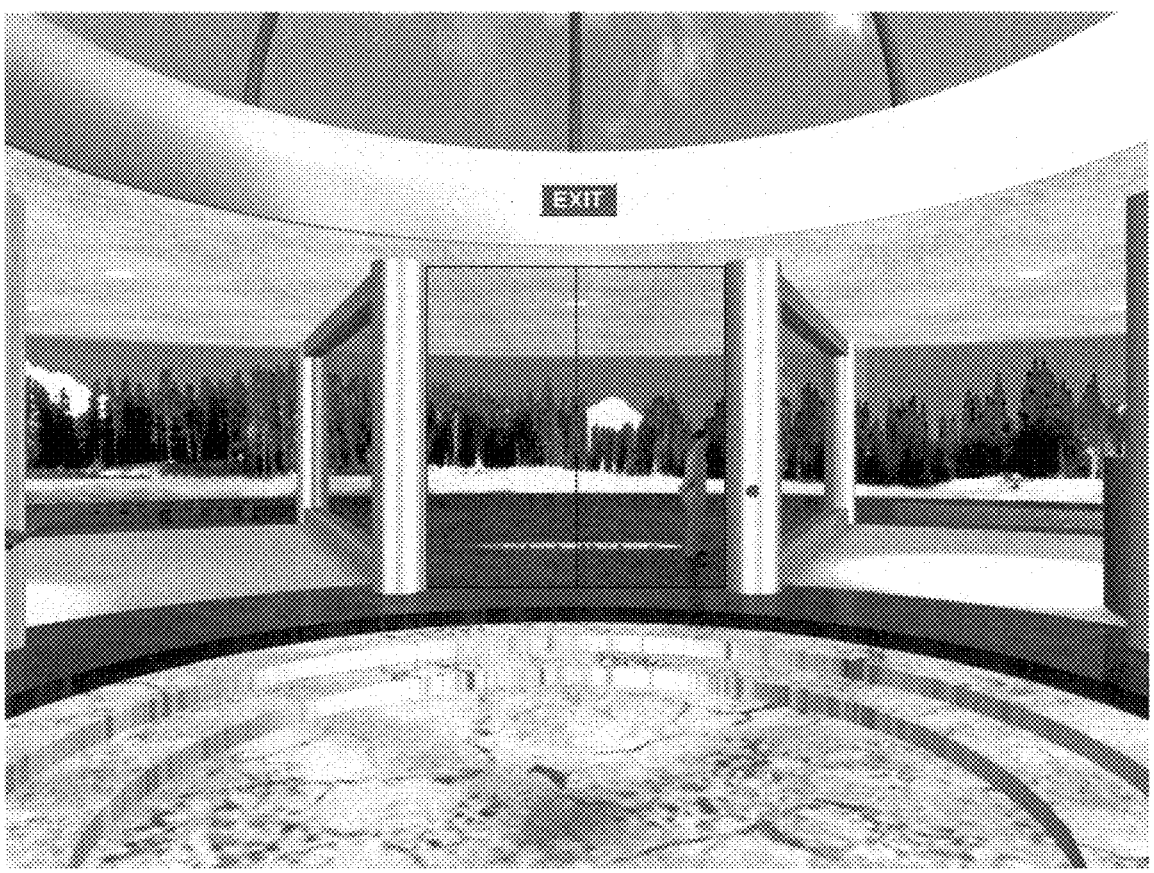
FIG. 5 is a screen display showing an image from the viewpoint of a student of leaving the Virtual Training Center of FIG. 1.
Figure 6:
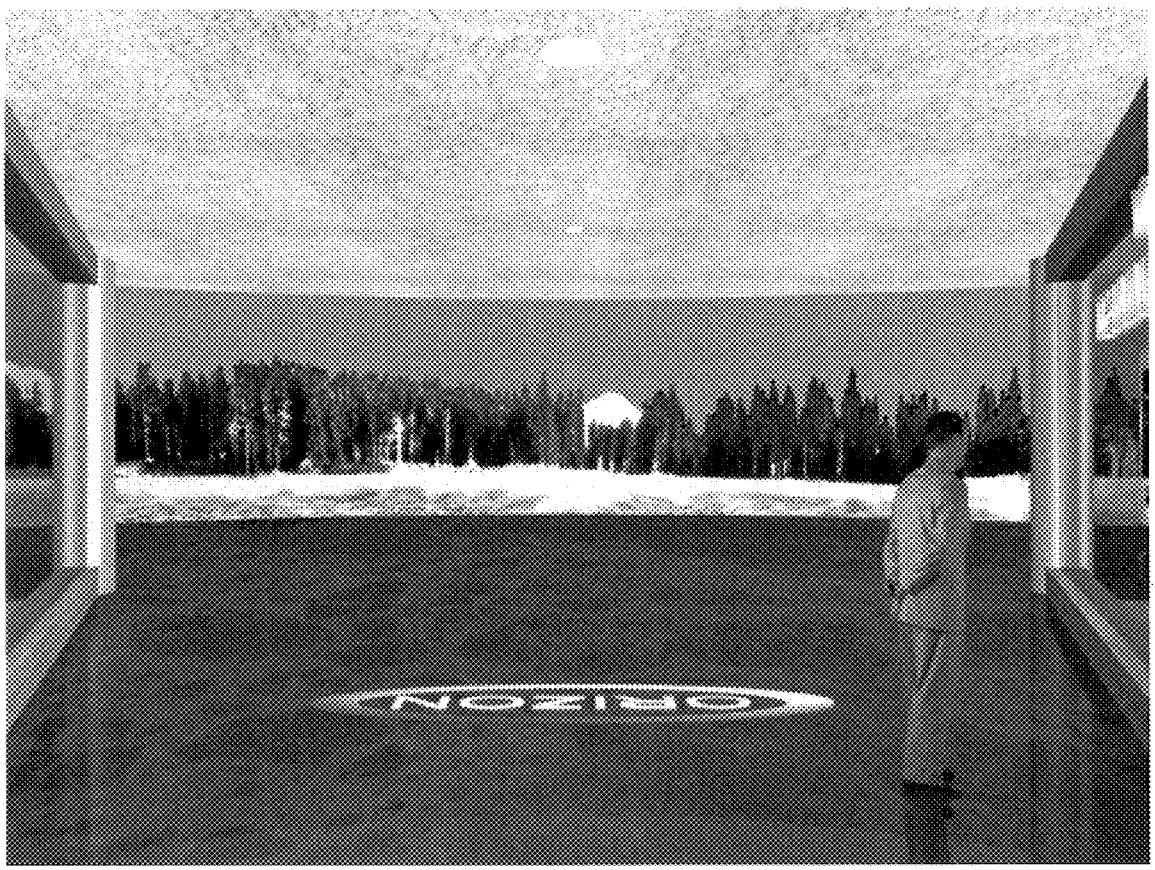
FIG. 6 is a screen display showing an image from the viewpoint of a student having left the Virtual Training Center of FIG. 1.

To be consistent with the virtual environment, when a user is ready to end the current session, he simply "pushes" to POWER button to turn the VIP off. The Application then shows the visual perspective of the user as he backs off the workstation, turns towards the exit doors of the VTC which open automatically letting external sounds of nature such as bird songs to be heard. (FIGS. 5 and 6)

Authors

To help an author design and organize a course before beginning to write and videotape substantive material, the System makes available to the author an Instructional Design pre-authoring tool, such as Designer's Edge from Allen Communications, Salt Lake City, Utah.

After designing and organizing a course, the author begins to construct it by assembling the various media. To create a complex instruction for a particular operation, such as the calibration of a measuring instrument, an author may choose to videotape the procedure instead of describing it in text and illustrations. The video is then digitized and stored into the computer. The author can divide the video into portion, which can be as short as a single frame. Controls on the display let the author move through the video frames forward or backward to determine exactly which frames should be included in any individual step of the training.

Portions of the video are assigned step numbers and the author can associate audio information and text with each step. Information is preferably passed to the student visually or aurally, as opposed to textually, to improve retention. Text can be associated with different areas of a displayed image so that when the student moves the cursor over that portion of the image, the text is displayed. For example, when a machine is displayed, the display can show the names of parts of the machine as the cursor is moved over those parts. By not displaying information until the cursor is over the region of interest, the display is less cluttered and conveys information more clearly to the students.

Various known video compression formats can be used. For example, the MPEG standard using 3x real time compression provides the advantage of near real time data compression with the flexibility of being able to edit the digitized material. Other video capture and compression standards, such as the Intel Indeo, can also be used although they typically do not support near real time compression. When a digitized video file is edited to produce video portions for a training module, the original file is saved so that it can be called and edited again if necessary.

The author has the ability to place tests at different points of the course. For example, the author may place tests after every screen to test that the student has learned the information presented on each screen. The tests are typically made up of questions that invite a student response that requires a minimum amount of typing, such as true or false questions or questions that require a number for the answer. Such questions can be easily interpreted by the computer. The student will have a time limit, typically 20 seconds, for answering each question on a test. After a question is posed, both an analog and a digital timer are displayed, showing the time remaining for answering the question and changing from green to yellow to red as the time expires. If the student does not pass the test within the allowed time, the screen containing the material that is being reviewed is redisplayed and the student has another opportunity to learn the information. The student is sent back after failing a test question as often as necessary until the student learns the information and can answer all questions correctly.

After each section of the training material, the author can place an overview of what was presented in that section. (FIG. 11) There can also be tests after a section of material is presented. If the student answers any of the questions incorrectly on the section test, the screen re-displays the page at which the information required to answer the question is introduced. This provides the student another opportunity to learn the material, before returning to the section test.

Similarly, there can be an overview at the end of the entire course and then a test on the material presented in the entire course. Incorrect answers on the overall test will also cause the screen in which the unlearned information was presented to be displayed and then the student will return to the overall test. Students have the opportunity to repeat the training material as often as necessary to learn the subject matter. Because the student's responses are not recorded by the System, and incorrect answers are not observed by other students or by an instructor, the student will be more relaxed and more able to assimilate information.

Thus, the student is preferably questioned about the subject matter three times: immediately after it is learned, at the end of the section, and at the end of the training module. The student typically must answer all of the questions correctly to be passed on to the next level. The number of questions at each level of review typically increases. Students can go back in the course to review sections already completed but cannot go forward out sequence. Once the entire course is completed, the student can access the entire course in any order much like a textbook becomes a reference after the course is completed. Of course, an author can arrange the review questions as he feels appropriate.

Figure 12:
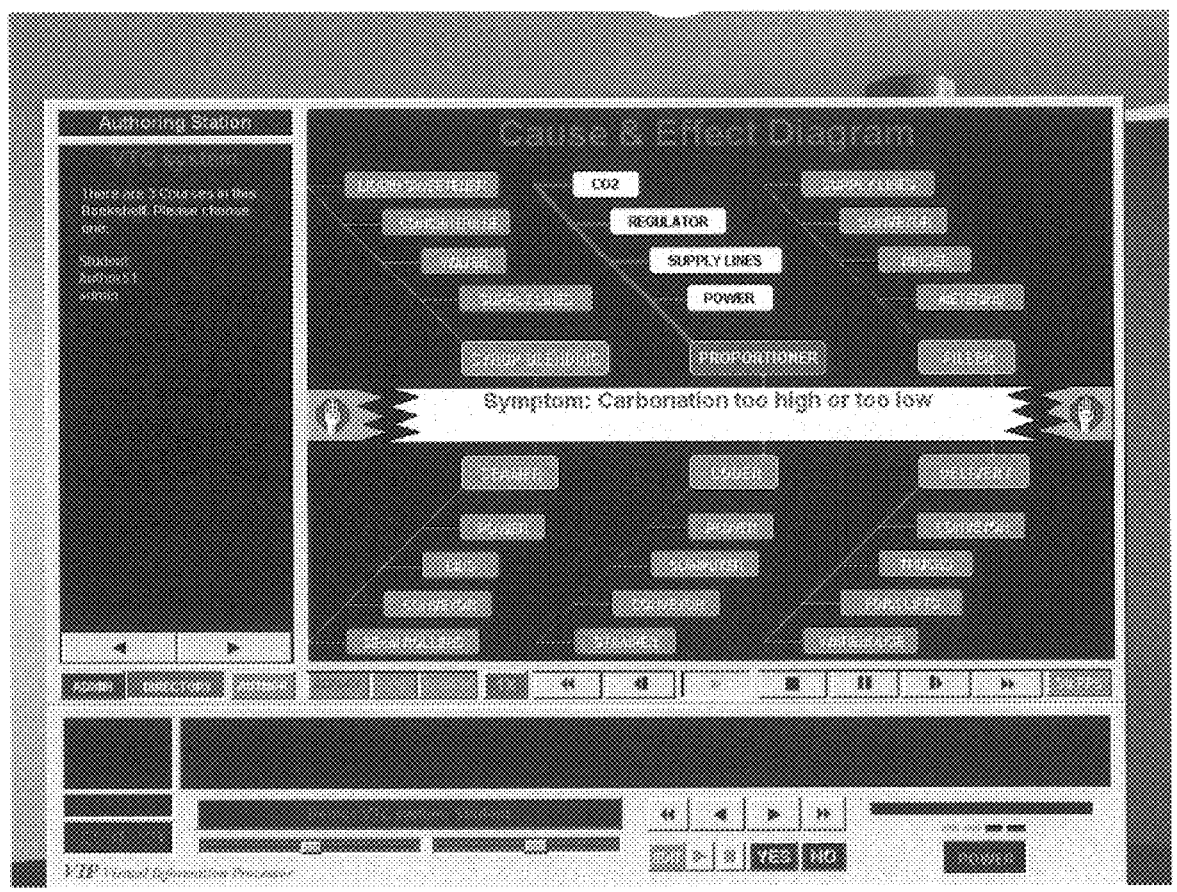
FIG. 12 is a screen display on the Virtual Interactive Player of FIG. 4 showing a typical fishbone diagram.
Figure 13:
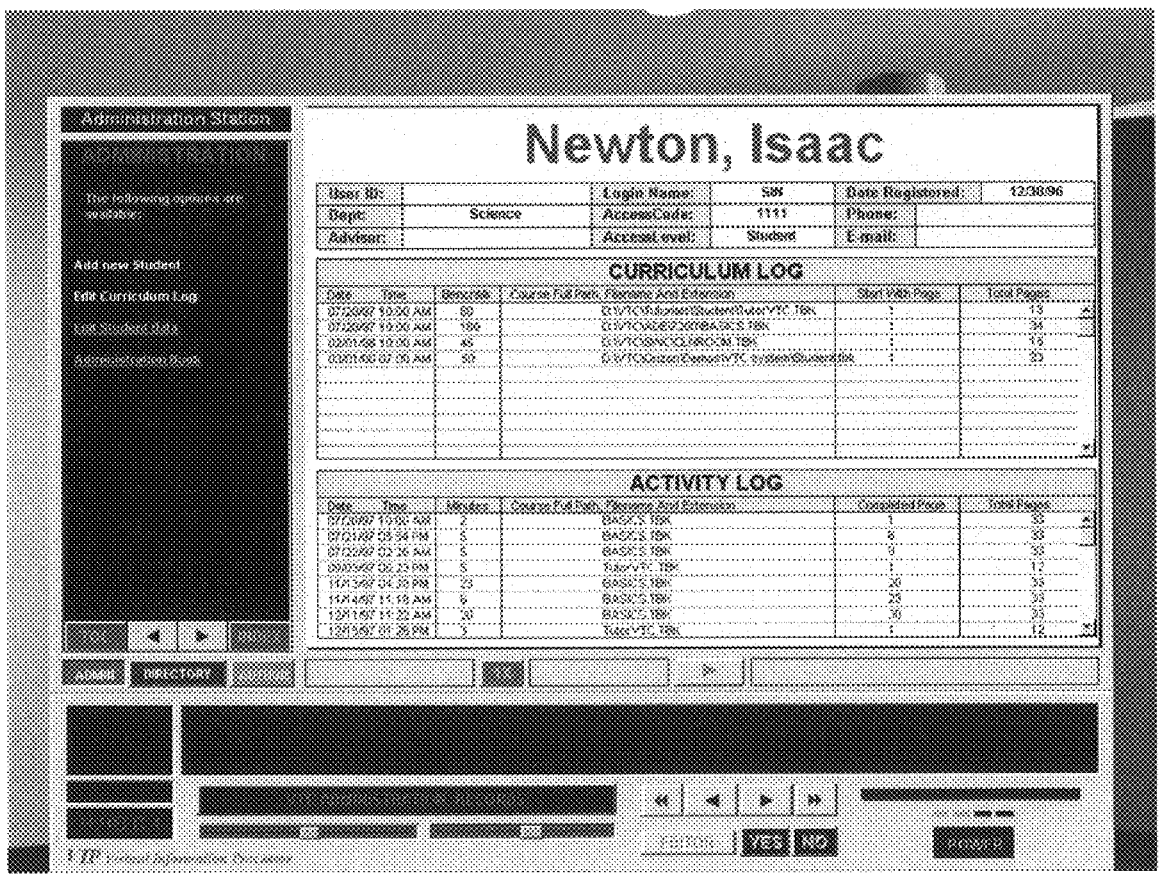
FIG. 13 is a screen display a showing on the Virtual Interactive Player of FIG. 4 a table of contents for administrators.
Figure 14:
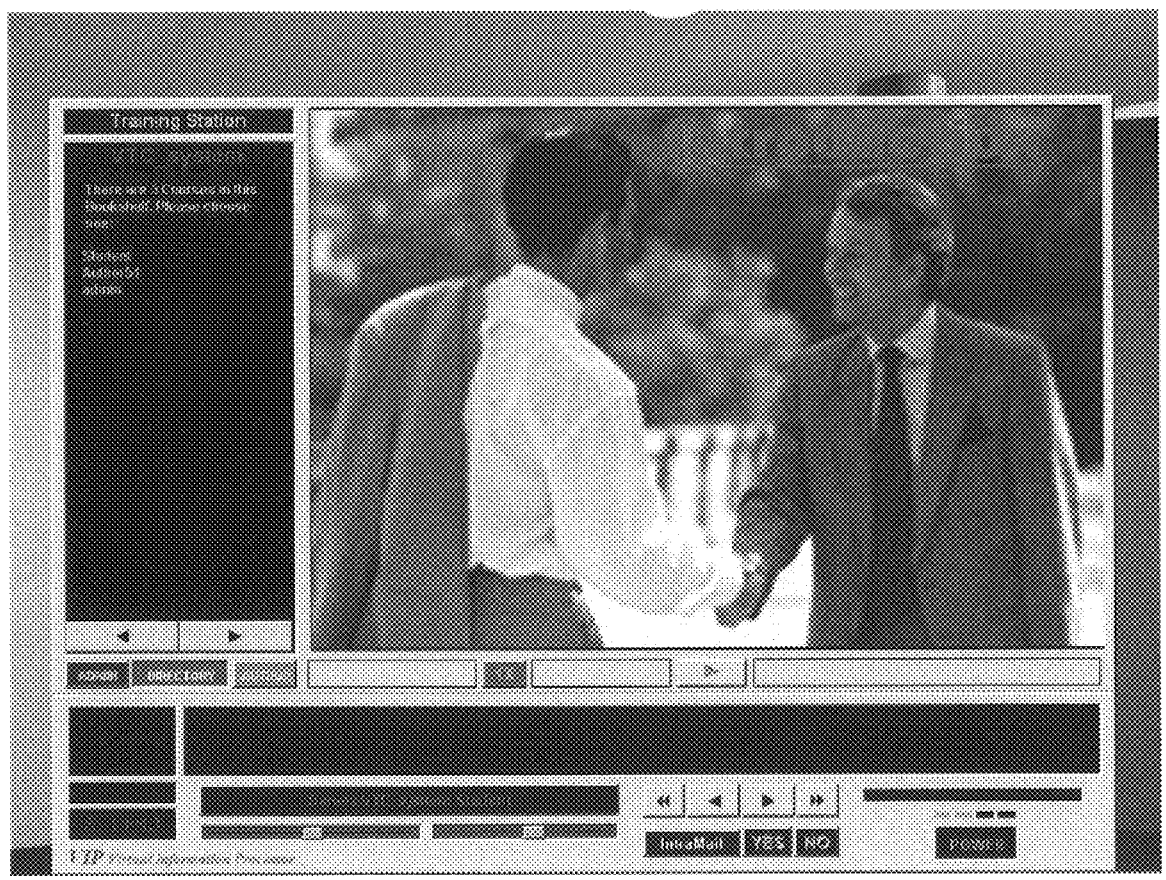
FIG. 14 is a screen display showing on the Virtual Interactive Player a typical student's Virtual Interactive Player Directory.

One embodiment of the invention includes capabilities to allow an author to easily create interactive "fishbone" (Ishikawa) diagrams (FIG. 12). These type of diagrams are very effective in troubleshooting by visually depicting the relationships of cause and effect. All objects comprising the interactive diagram are pre-designed so that the author only needs to add symptoms and remedies to construct an effective troubleshooting diagram. The student is guided visually and systematically towards a solution. At the conclusion of a troubleshooting session, the date, time, user's name, symptom and actions taken are recorded in the Troubleshooting Log database. The database can then be used to derive statistical information pertaining to a particular system such as frequency and type of failures by system or component.

An author can access screens of the program out of sequence, whereas a student must follow the prescribed order. An author is also allowed to access the underlying operating system for finding files or other administrative functions. One implementation of the invention uses the Window NT® operating system from Microsoft Corporation, Redmond, Wash. Other operating systems may also be used.

In the Author mode, the VIP has an additional button that the student never sees. When engaged, this button elevates the Editing Menu to full view. The menu includes several editing functions that the author can use to add, delete and modify the course content. All this is accomplished without programming. When disengaged, the EDIT button retracts the Editing Menu below the tabletop that supports the VIP and the Table of Contents as well as the Index of Topics are updated automatically.

One implementation of the inventive system was written primarily in ToolBook II from Asymetrix Corporation, Bellevue, Wash. This implementation includes both a run-time and a full version of ToolBook II. The full version of ToolBook II is only accessible by an author. The author then has the option of programming functions and enhancements beyond the capability of the VTC software system for incorporation into the training courses.

Administration

When an administrator logs on, the presented table of contents (FIG. 13) includes selections that allow the administrator to review and maintain student records, generate reports of such things as user activity and VTC activity, and access utilities, including the master course list, log-in names and passwords, re-certification schedules and issuance of certificates of completion.

The system includes a record for each student. The student record includes the date the student registered, the student activity log, and the student curriculum. The student records are stored on a separate computer so they cannot be edited by anyone except the administrator. To ensure integrity of the training records, the user activity information cannot be edited by anyone, including the administrator. The data can therefore be relied upon for certifying training for customer audits and to qualify for international certifications, such as ISO 9000.

The administrator works together with the student to define an appropriate curriculum for the student.

Various jobs require re-certification at regular time intervals. The system can generate a list of students requiring re-certification and manually or automatically, notify the students promptly.

The administrator maintains a Master Course List of all the courses available. The VIP Directory is generated automatically from this List.

Statistical information and graphs on the number of courses available over time, the average amount of time required to complete a course, the actual number of students taking and completing courses and other useful statistics are generated automatically from the student records. This information can be used by management to evaluate Return On Investment, help with budgeting and justify additional funding of the training program.

Students

After the student enters the Virtual Training Center and proceeds to a training workstation, the terminal displays his curriculum on the VIP Directory. (FIG. 14) It includes courses that the student has completed and courses to be completed. The student can only enter a course for which he has completed the prerequisites. A student can access courses only in the sequence specified by the administrator. As soon as a prerequisite course is completed, the next course becomes available for access automatically. Students are permitted to go back over completed courses for review or reference.

The VIP Directory begins with a general level and expands to specifics as the student makes selections. For example, the top level may have a class of particular machines for which training modules exist. The second level may include machines of a certain type within this class, the third level may include different manufacturers of this type of machines, the fourth level may include specific models systems of the selected machine and the fifth level may include training courses on basic theory of operation, operation, maintenance, etc. Before the student can select any particular module, he checks on the Directory to see whether he can take that course.

Once a course is selected, a mechanical sound is heard resembling the sound of a real CD ROM being inserted into a drive and the CD slot of the VIP is shown to be loaded with a virtual CD ROM that carries the course title. This feature is desirable not only to maintain the illusion of operating a real machine but to also indicate to the student the subject matter he is studying at all times. The CD ROM insertion is followed by the opening of the course's title page and from this point on the student is in control of the courses pace. Page navigation is accomplished with Forward and Reverse buttons.

The VIP's digital clock is a multifunction device that automatically displays the time of the day, elapsed seconds during a review or the frame number of a digital video. The student can also use it as a stopwatch by just clicking on it with the mouse.

The virtual monitor of the workstation has seven built-in pushbuttons that the student can use to fully control the digital video material included in a course. Thus a student can play, stop, pause, repeat, fast forward or single step forward or back any portion of a video procedure that needs to be examined or studied carefully. This level of control is very important in the learning process yet it is usually found only on very expensive professional video editing equipment.

When a student completes a course, notification of the completion is sent to the administrator automatically. The curriculum is then updated either manually by the administrator or automatically. After the curriculum is updated, the VIP Directory will indicate to the student that he can take courses for which the completed course is a prerequisite. Although automatic updating is easier, manual updating ensures that the administrator is aware of the progress that the students are making. Upon completion of a course, the system can print a completion certificate for presentation to the student by the training administrator, the student's supervisor, or other appropriate personnel. Also upon completion of a course, the student is allowed to access the material for that course in any order, rather than merely sequentially. The student can then use the course as a reference in his day-to-day performance of the task taught by the course.

To close the current course, a student merely presses the DIRECTORY button which retracts the CD ROM out of sight and returns to the VIP Directory.

Workstation

Figure 15:
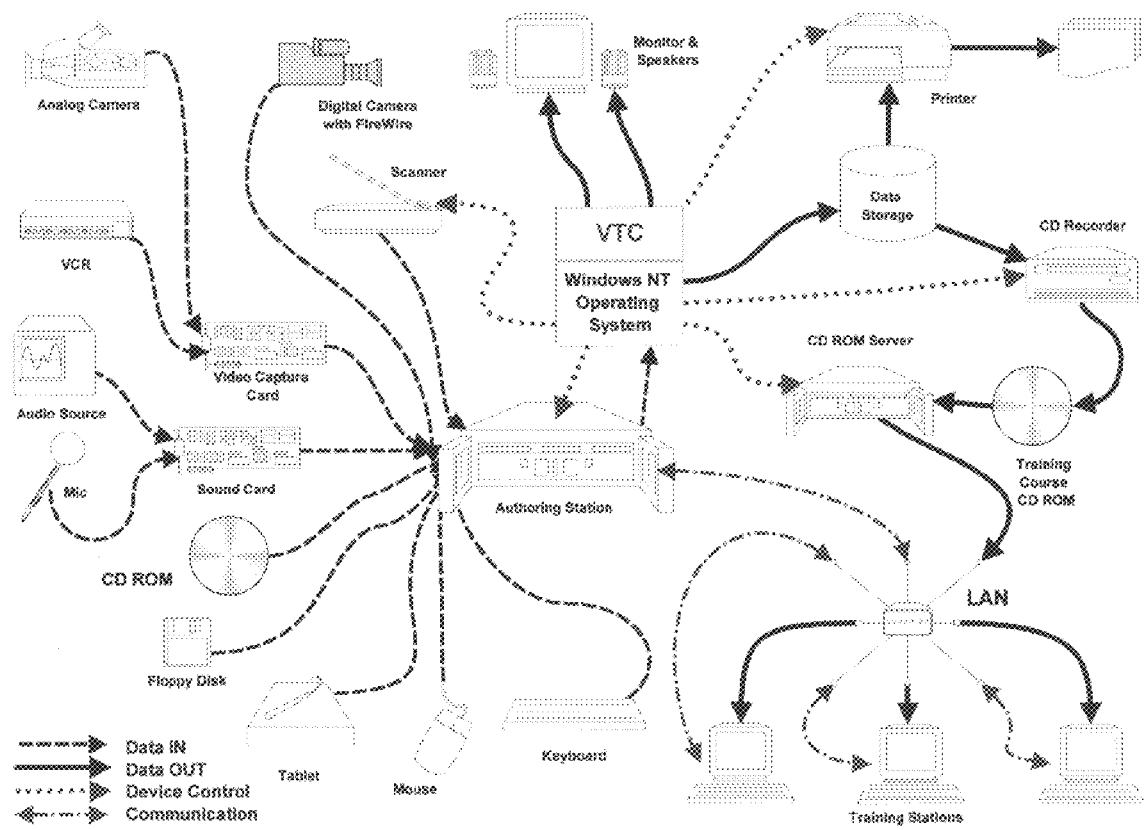
FIG. 15 shows the interrelationship of the hardware components of the present invention.

In a preferred embodiment, the system comprises the following hardware and software. FIG. 15 shows the relationship between the hardware components of the system. The system is not limited to the hardware and software below, which are listed only as examples.

System Software

High performance Operating System (e.g., Microsoft Windows NT 4.0 Workstation)
Hard Disk Defragmenter
Authoring, administration and deployment software (Orizon Multimedia VTC 97)

Application Software

Authoring (e.g., Asymetrix ToolBook II)
Instructional Design (Allen Communications Designer's Edge)
Word processing, Spreadsheet, Database (Microsoft Office Professional)
Vector/bitmap graphics, Flowchart, Animation (Graphics Suite)
Non-Linear video editor
Rae Sound wave editor
OCR software
Image capture and editing

Computer System

High performance CPU (Intel 200 MHz Dual PentiumPro)
Adequate Random Access Memory (128 MB or more)
A/V rated HDD
Ultra Wide SCSI controller
3.5" FDD
4× CD Recorder
SCSI CD ROM drives
Full function Keyboard
Pointing device
High speed LAN adapter

Video/Audio System

1024×768 color monitor
True Color (24 bit) video accelerator
Editable, real time video capture at 30 fps near real time
MPEG-1 compression
Hi-8 VCR
Hi-8 Camcorder
Flatbed color scanner
16-bit sound card
Stereo headset with boom mike

Console

19" rack
CD ROM drive bay
Drawer for keyboard and pointing device
Drawer for scanner
Power: 110 VAC An embodiment of the present invention is suitable for use as a training standard, providing the advantage of allowing students to use a standard training setting for training on a variety of topics, thereby reducing the requirement that students learn the use of different training tools and allowing the student to concentrate on the subject matter, rather than on the training equipment.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of self-paced, computer-based training for individuals, the method usable in a distracting work environment by focusing the individual's attention onto the training, comprising:

providing the student with a computer screen and an input device;

providing on the computer screen a series of images of a student entering a virtual training center and moving through the virtual training center toward a virtual training workstation, the images of entering and moving through the virtual training providing a virtual environment to focus the student away from the real environment and onto the training;

providing on the computer screen an image of the virtual training workstation with the virtual training center in the background, the virtual training center image in the background providing the student a virtual training environment, thereby reducing distractions from the outside, non-virtual environment;

presenting to the student on the virtual training workstation a choice of training programs for presentation, the training programs presented including only those programs that the student is qualified to undertake;

presenting to the student on the virtual training workstation an audio-visual presentation including first information to be learned;

presenting to the student on the virtual training workstation a test to determine whether the student has learned the first information;

if the student has learned the first information, presenting to the student on the virtual training workstation second information; and if the student has not learned the first information, repeating the presentation of the first information.

2. The method of claim 1, further comprising automatically sending a message to a system administrator when the student learns a pre-defined set of information.

3. The method of claim 1, in which providing on the computer screen an image of the virtual training workstation including providing lesson control features to the student, the lesson control features being presented as images of physical control devices, rather than as conventional computer control imagery.

4. In a method of computer-based training in which a student is presented information at a student-controlled pace and in which the student is tested periodically and re-presented information that the testing shows was not learned, the improvement comprising providing the student a virtual training center environment metaphor to symbolically provide the student a virtual training environment separate from the working environment.

5. The method of claim 4, in which providing the student a virtual training center environment includes presenting the student with an environment that simulates a physical, non-computer training environment.

6. The method of claim 4, in which providing the student a virtual training center environment includes presenting the student with a portion of a computer screen that represents a physical training environment.

7. The method of claim 4, in which providing the student a virtual training center environment includes showing a virtual student entering a virtual training facility.

8. The method of claim 5, in which the virtual training environment includes an isolated, serene environment.

9. The method of claim 4, in which providing the student a virtual training center environment metaphor includes providing the student with lesson controls that simulate controls on physical devices, rather than computer-based controls, to minimizes computer-related imagery that can make students uncomfortable.

10. In a computer-based training apparatus that presents information to a student at a student-controlled pace and that periodically tests the student and represents information that the testing shows was not learned, the improvement comprising:

means for providing the student a virtual training center environment metaphor to symbolically provide the student a virtual training environment separate from the working environment; and means for providing the student with lesson controls that simulate controls on physical devices, rather than computer-based controls, to minimizes computer-related imagery that can make students uncomfortable.

11. The apparatus of claim 10, in which the means for providing the student a virtual training center environment metaphor includes means for providing the student with lesson controls that simulate controls on physical devices, rather than computer-based controls, to minimizes computer-related imagery that can make students uncomfortable.

* * * * *